United States Patent Office.

FRIEDRICH RUNKEL, OF ELBERFELD, GERMANY, ASSIGNOR TO THE FARBENFABRIKEN, VORMALS FR. BAYER & CO., OF SAME PLACE.

TRIPHENYLMETHANE DYE.

SPECIFICATION forming part of Letters Patent No. 476,413, dated June 7, 1892.

Application filed December 18, 1891. Serial No. 415,518. (Specimens.) Patented in Germany August 22, 1890, No. 58,483; in England September 16, 1890, No. 14,621, and in France September 19, 1890, No. 208,330.

*To all whom it may concern:*

Be it known that I, FRIEDRICH RUNKEL, doctor of philosophy, chemist, (assignor to the FARBENFABRIKEN, VORMALS FR. BAYER & Co., of Elberfeld,) a subject of the Emperor of Germany, residing at Elberfeld, Germany, have invented a new and useful Improvement in the Manufacture of Coloring-Matters Derived from Triphenylmethane, (for which the aforesaid FARBENFABRIKEN have already obtained Letters Patent in Germany, No. 58,483, dated August 22, 1890; in England, No. 14,621, dated September 16, 1890, and in France, No. 208,330, dated September 19, 1890,) of which the following is a specification.

My invention relates to the production of a new triphenylmethane dye-stuff by combining molecular proportions of tetramethyldiamidobenzhydrol and alpha-hydroxynaphthoic acid in the presence of concentrated sulphuric acid and by oxidizing the thus-produced leuco compound of the formula

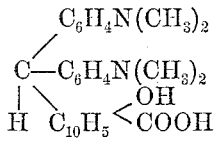

by means of oxidizing agents into the new coloring-matter.

In carrying out my process practically I proceed as follows: twenty kilos, by weight, of tetramethyldiamidobenzhydrol are thoroughly mixed with 14.7 kilos, by weight, of alpha-hydroxynaphthoic acid, and the resulting mixture is slowly added on cooling, and on constantly stirring to one hundred and seventy-five kilos, by weight, of sulphuric acid at 66° Baumé. After the said mixture has been introduced the whole mass is still stirred for about one hour without further cooling. The temperature gradually rising to 40° centigrade, a light-brown solution results. The reaction is complete as soon as a sample of the liquid when heated with a solution of sodium acetate and glacial acetic acid yields no intense blue, but only a slightly-bluish solution. The sulphuric-acid mixture thereupon is poured on one hundred and twenty kilos, by weight, of ice, and after adding two hundred liters of water the hydroxynaphthoic acid employed in excess separates and is filtered off. The resulting solution is almost neutralized by the addition of soda-lye, and the leuco compound produced is precipitated thereout by adding sodium acetate. By filtering, washing, and drying at 100° centigrade the leuco compound is easily to be separated in pure form. 26.4 kilos, by weight, of the latter are dissolved on heating in one hundred and sixty kilos, by weight, of acetic acid containing fifty per cent. of pure acetic acid and in twenty-two kilos, by weight, of hydrochloric acid of 1.15 specific gravity. After cooling to about 10° centigrade 47.7 kilos, by weight, of a lead dioxide paste containing thirty per cent. of lead dioxide are introduced into the said solution on continuous stirring. The lead which has been dissolved is separated by adding a solution of one kilo, by weight, of sulphuric acid at 66° Baumé in fifty liters of water, and after the formed lead sulphate has been filtered off the liquid is allowed to flow under continuous stirring into a solution of two hundred and thirty kilos, by weight, of soda-lye and two hundred liters of water. However, care must necessarily be taken by adding ice that the temperature does not rise. The new coloring-matter, which possesses according to its production the following composition,

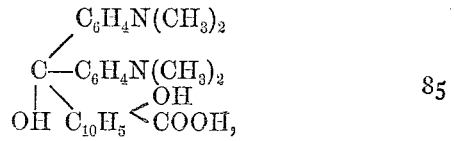

gradually separates as a flaky blue precipitate, which yields, after having been filtered off and washed out, a black paste. By drying the latter the pure dye-stuff is obtained as a brownish-red mass with copper-like luster. When pulverized, it represents a brownish powder. It is difficultly soluble in water, sodium carbonate, and ammonia liquid with blue color, somewhat more easily in soda-lye with the same color. When it is mixed with water and dilute hydrochloric or sulphuric acid is gradually added thereto, a deep-blue solution results at first, which on further adding the acid becomes bluish-black and at last brownish-red. The latter solution, obtained by employing an excess of acid, assumes a blue color when it is poured into a great quantity of water. In alcohol it dissolves easily with indigo-blue color. By concentrated sulphuric acid it is dissolved with violet color, which on the addition of ice or icy water becomes at first brown, then yellowish-red. The latter yellowish-red sulphuric-acid solution assumes a dull-brown color when mixed with a great quantity of water. Out of its solutions in dilute mineral acids it is again precipitated by the addition of sodium acetate. When treated with reducing agents, it is converted into the aforesaid leuco compound, which is again oxidizable into the coloring-matter. It is capable of dyeing in acetic-acid baths wool, silk, and cotton, after having previously been mordanted with chromium salts. Especially it is adapted for dyeing wool mordanted with chromium salts and for printing cotton fabric. In the latter case a paste containing the dye-stuff mixed with chromium acetate and one of the usual thickenings must be employed. It produces shades of a pure-blue color and of a perfect fastness to soaping.

Having thus described my invention and in what manner it can be performed, that which I claim as new, and desire to secure by Letters Patent, is—

1. The process of producing a new triphenylmethane dye-stuff by combining in the presence of concentrated sulphuric acid equimolecular proportions of tetramethyldiamidobenzhydrol and alpha-hydroxynaphthoic acid, removing the uncombined alpha-hydroxynaphthionic acid, and by further oxidizing the thus-produced leuco compound.

2. As a new product, the triphenylmethane dye-stuff having the formula,

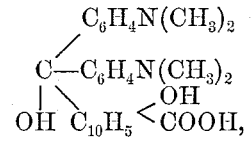

and which in a dried and pulverized state is a brownish powder difficultly soluble in water, sodium carbonate, and ammonia, more soluble in soda-lye with blue color, and on adding a dilute mineral acid a deep-blue solution results, which on the further addition of acid becomes bluish black, then brownish red, and on further addition of water recovers a blue color. The alcohol solution is indigo-blue, that in concentrated sulphuric acid is violet in color, which on cooling is first brown, then yellowish red, which assumes a dull-brown color on mixing with a large quantity of water and is precipitated by the addition of sodium acetate, and when treated with reducing agents is converted into the corresponding leuco compound, which again can easily be oxidized into the dye-stuff, and producing shades of a pure-blue color and perfect fastness to soaping.

In testimony whereof I have signed my name in the presence of two subscribing witnesses.

FRIEDRICH RUNKEL.

Witnesses:
WM. ESSENWEIN,
RUDOLPH FRICKE.

It is hereby certified that in Letters Patent No. 476,413, granted June 7, 1892, upon the application of Friedrich Runkel, of Elberfeld, Germany, for an improvement in "Triphenylmethane Dyes," errors appear in the printed specification requiring the following corrections: In line 51, page 1, the word "hydroxynaphthoc" should read *hydroxynaphthoic;* lines 38–39, page 2, the compound word "alpha-hydroxynaphthionic" should read *alpha-hydroxynaphthoic;* in line 59, same page, the word "cooling" should be stricken out and the words "*the addition of ice or icy water* be inserted; and in line 62, same page, the words "is precipitated" should be stricken out and the words *it is precipitated from its solutions in dilute mineral acids* inserted instead; and that the Letters Patent should be read with these corrections therein that the same may conform to the record of the case in the Patent Office.

Signed, countersigned, and sealed this 28th day of June, A. D. 1892.

[SEAL.]
GEO. CHANDLER,
*First Assistant Secretary of the Interior.*

Countersigned:

W. E. SIMONDS,
*Commissioner of Patents.*